Nov. 14, 1933.   H. BRUCKER   1,934,695
POURING SPOUT AND CONTAINER
Filed Jan. 27, 1932
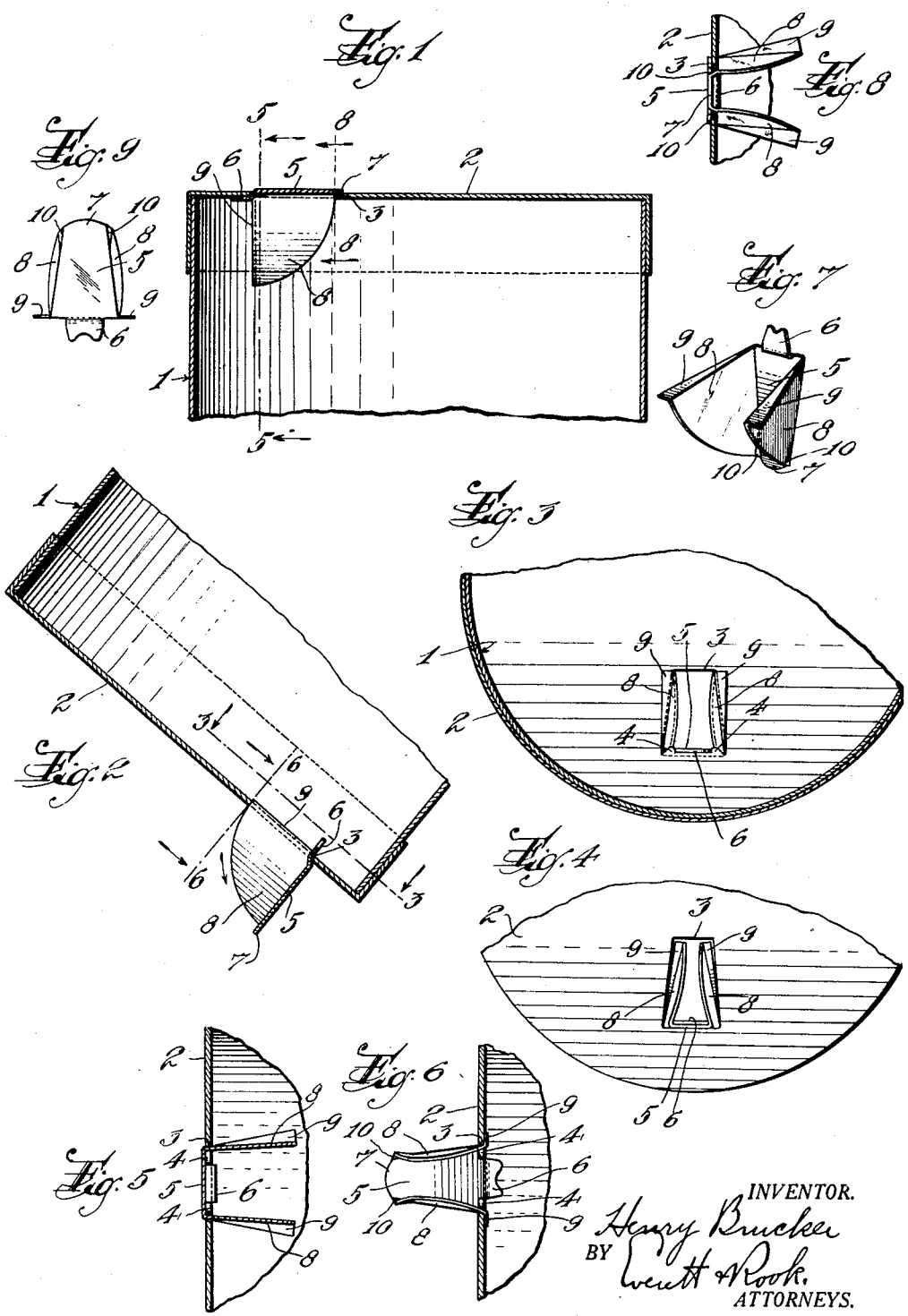
INVENTOR.
Henry Brucker
BY Everett & Rook.
ATTORNEYS.

Patented Nov. 14, 1933

1,934,695

UNITED STATES PATENT OFFICE 1,934,695

POURING SPOUT AND CONTAINER

Henry Brucker, Maplewood, N. J., assignor to American Aluminum Ware Co., Newark, N. J., a corporation of New Jersey Application January 27, 1932. Serial No. 589,085

3 Claims. (Cl. 221—11)

This invention relates in general to a pouring spout for containers, and particularly to spouts of the type including a bottom or body portion hingedly connected at one end of a discharge aperture in a wall of the container and formed with resilient sector-shaped side wings concentric with the axis of hinging to frictionally engage the walls of said aperture, so that the body portion normally serves as a closure for the aperture and is adapted to be swung outwardly therefrom to serve as a pouring spout when it is desired to discharge the contents of the container through said aperture. The side wings of the spout are usually divergent from each other away from the body portion so as to resiliently engage the walls of the aperture to hold the spout in closed position and maintain a tight engagement with the walls of the opening when the spout is open.

One object of the invention is to provide a pouring spout of this character wherein the rear edges of the side wings, or the edges of the wings disposed within the container when the spout is connected thereto, are provided with novel and improved stop flanges to engage the inner wall of the container and prevent the spout from being pulled out of the aperture, said stop flanges being so constructed that the spout may be easily inserted into the discharge aperture from the outside of the container by simply pressing the wings toward each other as the spout is pushed through the aperture, the flanges also extending from the arcuate edges of the wings to points adjacent the hinging point of the spout so as to provide a secure hold of the spout upon the inner walls of the container.

Another object of the invention is to provide such a pouring spout having a tongue to be inserted into and engage one end of the discharge aperture in the container to cooperate with said flanges on the side wings for pivotally connecting the spout to the container, whereby the tongue prevents the spout from being bodily pulled from the discharge aperture when the spout is in closed position and the stop flanges positively prevent the spout from being pulled from the aperture when the spout is in open position.

Other objects of the invention are to provide a combination of such a spout and a container, wherein the container has lugs projecting into the discharge aperture from one end thereof, said lugs being spaced from each other to receive the tongue of the pouring spout between them and being spaced from the sides of the aperture to receive the side flanges of the spout between the lugs and the sides of the aperture, said lugs providing bearings for the end of the spout to prevent it from being pushed into the aperture; to provide a pouring spout formed of resilient sheet material and having a body portion of a size and shape to close a discharge aperture in a container and constructed to be hingedly connected to a container at one end of such discharge aperture, said body also having sector-shaped side flanges concentric with the point of hinging and offset from the body portion at its free end to provide shoulders to snap under the side edges of such a discharge aperture so as to hold the spout in closed position; and to obtain other advantages and results as will be brought out by the following description.

Referring to the accompanying drawing, in which corresponding and like parts are designated throughout the several views by the same reference characters, Figure 1 is a fragmentary vertical sectional view through one end of a container having a pouring spout embodying my invention connected thereto and shown in closed position;

Figure 2 is a similar view showing the spout in open position;

Figure 3 is a transverse sectional view, on the line 3—3 of Figure 2;

Figure 4 is a front elevation of the end of the container and the pouring spout, showing the manner of inserting the spout into the discharge aperture;

Figure 5 is a vertical sectional view, on the line 5—5 of Figure 1;

Figure 6 is a transverse sectional view, on the line 6—6 of Figure 2;

Figure 7 is a detached perspective view of the pouring spout;

Figure 8 is a vertical sectional view, on the line 8—8 of Figure 1, and

Figure 9 is a detached plan view of the spout.

In the specific embodiment of the invention shown in the drawing, the reference character 1 designates a container of any suitable construction having a top or cover 2. The discharge aperture 3 is formed in the top or cover 2, said aperture being substantially quadrangular in shape and provided at one end with lugs 4 which project inwardly of the aperture in spaced relation to each other and to the respective sides of the aperture.

The pouring spout is preferably formed of resilient sheet metal and includes a body portion or bottom 5 of substantially the same size and shape as the discharge aperture 3, except that one end of the body is adapted to overlie the lugs 4 and has a longitudinally projecting tongue 6, preferably offset from the plane of the body 5 a distance substantially equal to the thickness of the cover 2 of the container, and the other end is provided with a nose or extension 7 to overlie the end of the aperture opposite the lugs 4 and provide a finger piece for actuating the spout. The body is preferably approximately the same width as the aperture 3, and the sides thereof are provided with integral resilient wings 8 which are sector-shaped and concentric with the end of the spout from which projects the tongue 6. Also, the wings preferably diverge from each other away from the body as shown in the drawing, particularly Figure 5. The straight free edges of the wings 8 are provided with angularly projecting flanges 9 which gradually decrease in width from the arcuate edges of the wings toward the body 5 of the spout so that said edges of the flanges are substantially coincident with the sides of the body where said edges merge into the body. In other words, the flanges 9 gradually decrease in width from the arcuate edges of the wings toward the body, and while the flanges have been shown as extending the full length of the rear edges of the wings, of course, said flanges might terminate somewhat short of the body.

In connecting the spout to the container, the tongue 6 is first inserted into the discharge aperture 3 to lie against one end of the aperture between the lugs 4, as clearly shown in Figures 2 and 6, and the wings 8 are arranged between the lugs 4 and the sides of the aperture and are pressed toward each other as shown in Figure 4 of the drawing until the edges of the flanges 9 clear the sides of the aperture, whereupon the spout is hingedly pushed through the aperture and the wings released. This permits the wings to spring outwardly into frictional contact with the sides of the aperture, and when the spout is swung into open position, as shown in Figures 2, 3 and 6, said flanges 9 abut the inside of the wall or cover 2 of the container to prevent the spout from being pulled out of the aperture. When the spout is swung into closed position, as shown in Figures 1 and 5, the tongue 6 prevents the spout from being bodily pulled out of the aperture, and of course the edges of the flanges 9 also restrain outward movement of the spout. The lugs 4 serve as a bearing for the hinging end of the body 5 of the spout to prevent the spout from being pushed into the aperture, and similarly, the nose 7 on the body 5 prevents the other end of the body from being pushed into the aperture.

For the purpose of frictionally holding the spout in closed position, the side wings 8 at the free end of the body 5 may be offset or bent outwardly, as shown in Figures 8 and 9, to form beveled triangular shoulders 10 to snap under the side edges of the aperture, as clearly shown in Figure 8, when the spout is closed, so as to hold the spout in closed position.

From the foregoing, it will be observed that a spout embodying my invention can be easily and quickly applied to a container from the outside of the container by a relatively unskilled operator; that the spout is simple and inexpensive to construct; that the spout will be positively held against accidental displacement from the discharge aperture of the container after the spout has once been connected to the container; and therefore a spout and container embodying my invention can be quickly assembled and can be economically produced in large quantities. The flanges 9 effectually cooperate with the tongue 6 to hingedly connect the spout to the container.

Many modifications and changes in the details of construction of the spout and container will occur to those skilled in the art without departing from the spirit or scope of the invention, and therefore I do not desire to be understood as limiting myself except as required by the following claims when construed in the light of the prior art.

Having thus described the invention, what I claim is:

1. The combination of a container having a pouring aperture in one wall formed with inwardly projecting lugs at one end thereof spaced from each other and the side walls of said opening, a pouring spout of resilient sheet material comprising a body of a size and shape to close said aperture and having a tongue engaging the edge of said aperture at said end between said lugs to hingedly connect the body to the container for opening and closing said aperture, said body having sector-shaped side wings concentric with the point of hinging frictionally engaging the sides of said aperture and being of such radius that the arcuate edges of said wings engage the end of the aperture opposite the hinging point, each of said side wings being disposed between one of said lugs and the adjacent side of said opening, the rear edges of said wings having flanges projecting angularly outwardly from the wings to abut the inner side of said wall of the container and the edges of said flanges being substantially coincident with the end of said body at the point of the hinging and gradually diverging from the respective wings in the direction of the arcuate edges of the latter, whereby said spout may be connected to the container from the outside thereof by inserting said tongue into said aperture between said lugs with the end of the body abutting the lugs and the side wings between said lugs and the sides of said aperture, springing said wings toward each other to permit said flanges to clear the sides of the aperture, and then hingedly swinging the spout into said aperture and releasing said wings, whereupon said flanges prevent the spout from being pulled out of the aperture when the spout is in open position, said tongue prevents the spout from being bodily removed from the aperture when the spout is in closed position and said lugs prevent the spout from being pushed inwardly through said opening.

2. The combination of a container having a pouring aperture in one wall, a pouring spout of resilient sheet material comprising a body of a size and shape to close said aperture, means hingedly connecting one end of said body to said wall at one end of said aperture to permit swinging of said body for opening and closing said aperture, said body having sector-shaped side wings concentric with the point of hinging and of such radius that the arcuate edges of said wings engage the end of the aperture opposite the hinging point, said side wings being offset outwardly from the sides of said body at the free end of the latter to form beveled triangular shoulders between said body portion and said side wings to snap under the side edges of said aperture and hold the spout in closed position.

3. A pouring spout for containers having a pouring aperture in one wall, comprising a body of resilient sheet material of a size and shape to close said aperture and constructed to be hingedly connected at one end to such a wall of a container at one end of such pouring aperture, said body having sector-shaped side wings concentric with the point of hinging and of such radius that the arcuate edges of said wings engage the end of the aperture opposite the hinging point, said side wings being offset outwardly from the sides of said body at the free end of the latter to form beveled triangular shoulders between the body of the spout and said side wings to snap under the side edges of such an aperture in a container.

HENRY BRUCKER.